Figure 1:
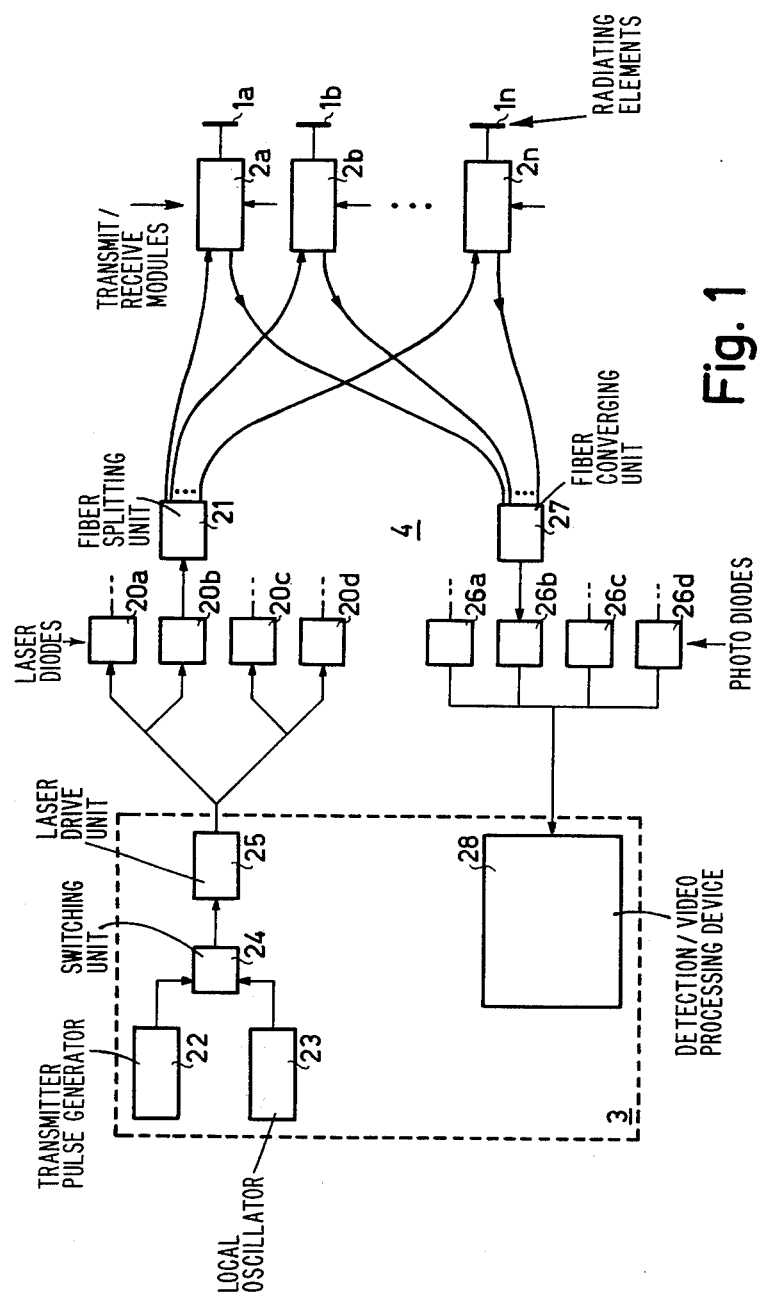

United States Patent [19]

Bodmer et al.

[11] 4,258,363
[45] Mar. 24, 1981

[54] PHASED ARRAY RADAR

[75] Inventors: Maximiliaan H. Bodmer, Hengelo; Hendrik Hoogstraate, Delden; Gerrit Van Rooyen, Haaksbergen, all of Netherlands

[73] Assignee: Hollandse Signaalapparaten B.V., Hengelo, Netherlands

[21] Appl. No.: 54,533

[22] Filed: Jul. 3, 1979

[30] Foreign Application Priority Data

Jun. 30, 1978 [NL] Netherlands .......................... 7807170

[51] Int. Cl.³ ............................................. G01S 13/06
[52] U.S. Cl. ............................. 343/16 R; 343/100 SA
[58] Field of Search ........................ 343/16 R, 100 SA

[56] References Cited
U.S. PATENT DOCUMENTS 4,028,702  6/1977  Levine ............................ 343/100 SA Primary Examiner—T. H. Tubbesing

[57] ABSTRACT

In a phased array radar system with the radiating elements of the antenna are connected to associated r.f. transmitter-receiver modules. Each of the modules receives a transmitter signal and a local oscillator signal and delivers, upon reception of an echo signal via the antenna an i.f. signal. Furthermore a system of fiber optical waveguides is incorporated to distribute to the modules the transmitter signal and the local oscillator signal, both of which signals being modulated on carriers, which are frequency-matched to the system of fiber optical waveguides. Each of the modules comprises a demodulator to procure the transmitter signal and the local oscillator signal from the applied modulated signals.

4 Claims, 2 Drawing Figures

PHASED ARRAY RADAR

The invention relates to a phased array provided with an antenna, of which the radiating elements are connected to associated r.f. transmitter-receiver modules. Each of the modules are fed with a transmitter signal and a local oscillator signal and, upon reception of an echo signal via said antenna, each of the modules delivers an i.f. signal.

Such a radar is known and is described in an article of G. C. Bandy, L. J. Hardeman and W. F. Mayes "MERA modules - how good in an array?", Microwaves, August 1969. In this article the transmitter signal and the local oscillator signal are distributed uniformly over all modules and are applied via coaxial connections. Also each of the modules delivers the i.f. signal via a coaxial connection.

In general the energy transfer between a signal source/signal processor on the one side and the modules coupled to the individual radiating elements on the other side may be realized in various ways, for instance through radiation between a horn feed connected to the signal source/signal processor and additional radiating elements connected to the modules, or through a system of waveguides, coaxial connections or striplines.

The invention has for its object to provide a phased array radar as set forth in the opening paragraph, where the energy transfer between the signal source/signal processor on the one side and the individual modules on the other side is realized in a way different from that indicated above.

According to the invention a system of fiber optical waveguides is incorporated to distribute to said modules the transmitter signal and the local oscillator signal, both of which signals being modulated on carriers which are frequency-matched to the system of fiber optical waveguides, where each of these modules comprises a demodulator to procure the transmitter and the local oscillator signals from the applied modulated signal.

The use of fiber optical waveguides in radars is not altogether novel; for instance, the U.S. Pat. No. 4,028,702 describes a radar system provided with a phased-array antenna, where the energy transfer from the signal source to the individual radiating elements occurs through fiber optical conductors. For ach of the modules coupled to the radiating elements a large number of fiber optical conductors of different length is thereto incorporated, where each of the modules comprises as many demodulators as there are fiber optical conductors connected to the particular module, as well as an electronically controlled switch and an r.f.-power amplifier. The electronically controlled switch is used to select a signal transferred through a specific fiber optical conductor and demodulated; the selection of this conductor is determinative for the phase of the signal emitted by the radiating element concerned. Although by this arrangement the incorporation of an electronically controlled phase-shifting element in the modules is avoided, the use of a large number of fiber optical conductors with associated optoelectronic components must be regarded as a disadvantage.

Figure 2:
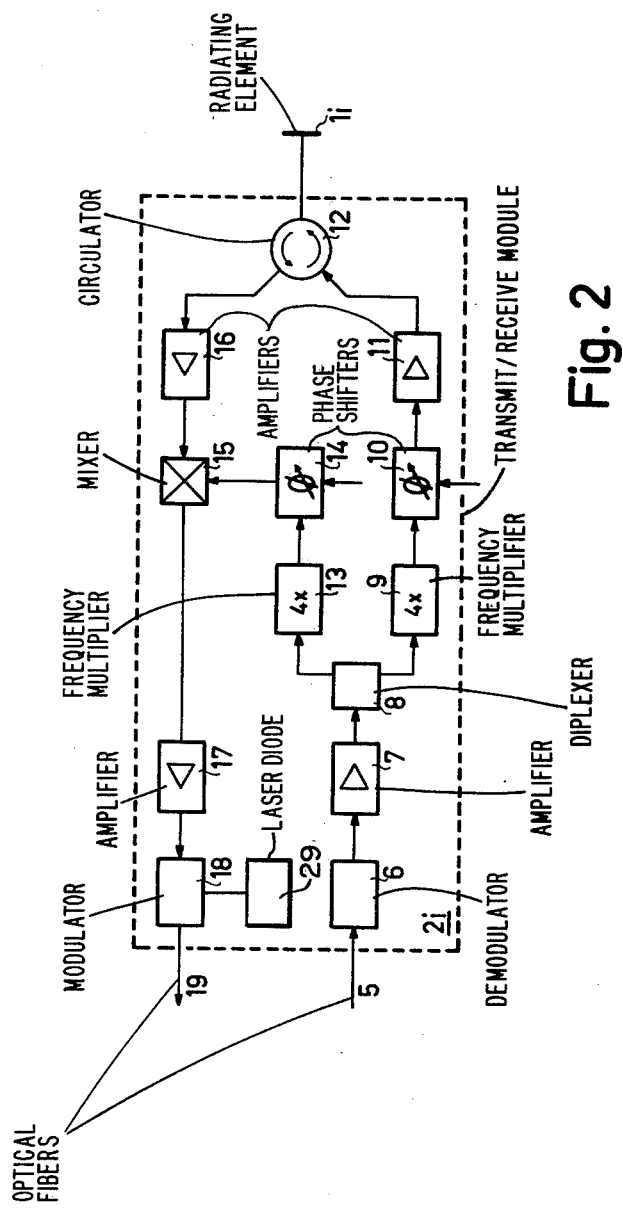

The invention will now be described with reference to the accompanying figures, of which:

FIG. 1 is a schematic block diagram of the phased array radar in accordance with the present invention, and FIG. 2 illustrates an embodiment of a module coupled to a radiating element and employed for the transmission and reception of r.f. signals.

The radar system of FIG. 1 comprises a phased array antenna of which the radiating elements are designated $1a, 1b, \ldots, 1n$. These elements are connected to associated modules $2a, 2b, \ldots, 2n$ used for the transmission and reception of r.f. signals. Each of these modules is fed with a transmitter signal and a local oscillator signal and, upon reception of an echo signal by the phased array antenna, each of these modules delivers an i.f. signal. The radar thereto contains a signal source/signal processing unit 3 and a transmission system 4 between the signal source/signal processing unit and the individual modules. The transmission system 4 comprises conductors for the r.f. transmitter and local oscillator signals and the i.f. signals, as well as components for the distribution and collection of the signals transferred via this transmission system. The transmission system 4 is built up of fiber optical waveguides, hereinafter called optical fibers. The application of the optical fibers in the transmission system may be realized in different ways, viz.:

1. the supply of the transmitter and local oscillator signals to the modules via one optical fiber; in this case the i.f. signal may be delivered by each of the modules through:
   a. a stripline or coaxial cable;
   b. a separate optical fiber;
   c. the same optical fiber conveying the transmitter and local oscillator signals to the module concerned.

2. the supply of the transmitter and local oscillator signals to the modules via separate optical fibers; in this case the i.f. signal may be delivered by each of the modules through:
   a. a stripline or coaxial cnductor;
   b. a separate optical fiber;
   c. the same optical fiber conveying the transmitter signal to the module concerned;
   d. the same optical fiber conveying the local oscillator signal to the module concerned.

The transfer of transmitter and local oscillator signals and, as the case may be, i.f. signals via optical fibers occurs by modulating these signals on carriers generated by a light source and matched to the optical fibers. In the cases under 1. above the transmitter and local oscillator signals are fed to each of the modules via one optical fiber. Since it is not necessary that these two signals be transferred to the modules simultaneously, the transmitter signal (transmitter pulses) and the local oscillator signal are modulated on one and the same carrier, the local oscillator signal in the time intervals between the successive transmitter pulses. If however the i.f. signal is passed through the optical fiber which carries also the transmitter signal and/or the local oscillator signal, as in the cases of 1c, 2c and 2d above, this i.f. signal is modulated on a separate carrier.

It is of advantage to select a transmitter frequency of about 750 MHz; at this moment difficulties will soon be encountered in modulating frequencies above 1 GHz on the optical carriers. By providing each of the modules with an element that, say, quadruples this transmitter frequency, this frequency is still brought in a usable frequency range, in this case the S band. If the frequency transferred by the optical fibers is selected much smaller than the above value, the frequency multiplication in the modules must be increased in like proportion and, as a consequence, the amplification to be introduced will be of such an extent that, apart from the resulting loss in efficiency, unacceptable phase noise arises.

FIG. 2 shows an embodiment of a module matched to a transmission system falling under the above case 1b. The module itself is denoted by 2i and the radiating element connected thereto by 1i. A 725 MHz transmitter signal and a 750 MHz local oscillator signal are fed, via the optical fiber 5, to a demodulator 6 forming part of the module 2i. The transmitter and local oscillator signals modulated on the same optical frequency are demodulated therein by means of a photo-diode circuit, then amplified in amplifier 7 and fed to diplexer 8. In diplexer 8 the transmitter signals, i.e. the transmitter pulses, are separated from the local oscillator signal present in the time intervals between the successive transmitter pulses. The transmitter pulses are subsequently fed to unit 9, where the frequency of the transmitter signals is quadrupled, thus raised to 2900 MHz, then passed through the phase shifter 10, the S-band power amplifier 11, the circulator 12 and finally emitted by the radiating element 1i. The local oscillator signal is applied to unit 13, where the frequency of this signal is multiplied in the same way as the transmitter signal in unit 9, thus raised to 3000 MHz, and then supplied to the mixer 15 via phase shifter 14. The echo signals received by radiating element 1i are passed, via circulator 12 and amplifier 16, to mixer 15 as well, where their frequency is reduced to the intermediate frequency of 100 MHz. The signals so obtained are fed, via i.f. amplifier 17, to modulator 18, where they are modulated on the optical frequency concerned provided by a laser diode 29 and delivered by the module via the optical fiber 19. In the module here described the phase control occurs in units 10 and 14 after quadruplication of the transmitter and local oscillator frequency. After this process the phase of the signals concerned lend themselves better for adjustment than if this were to be performed before the frequency multiplication. In the latter case the phase control would have to be realized through adjustment of so called lumped elements; in the case in question, this would have to be done with an accuracy four times as great, owing to the frequency multiplication after the phase control. The phase control of the signals emitted by the individual radiating elements, as well as that of the local oscillator signals concerned, is done with a computer as is customary with phased-array antennas.

To generate the optical carriers for the energy transfer via the optical fibers, a light source should be available on the transmitter side of the optical fibers. For this purpose it is preferable to employ a laser because of the high energy concentration of the light beam emitted, although light emitting diodes (LED's) can be used for certain applications. For the transfer of the transmitter and local oscillator signals to the various modules the carriers could be generated by a single gas laser, of which the light beam emitted is distributed over all or a limited number of optical fibers which are in turn split into a greater number of optical fibers. Such lasers are however expensive and possess a relatively short lifetime. It should further be noted that the splitting of an optical fiber into several optical fibers, as known for example from Irving Reese, "Fiber Optical Data Bus for Control—A Reality?", Control Engineering, July 1977, pp. 43–48, from the French patent application Ser. No. 2.299.656 and from the German patent application Ser. No. 25 16 975, still involves excessive energy losses.

For this reason the choice fell on a system using a plurality of GaAs laser diodes. Through the relatively low energy concentration these diodes emit a light beam which is divided over only a limited number of optical fibers. In transmission system 4 of FIG. 1, only four of such laser diodes 20a–d are shown. Only for laser diode 20b it is indicated that in unit 21 consisting of optical components the light beam emitted is divided over a number of optical fibers coupled to the various modules. By using 160 laser diodes, say, and dividing the light beam emitted by each of these diodes over 25 optical fibers, a transmission system is obtained for a phased array antenna containing 4000 modules.

As already stated, the transmitter signal and the local oscillator signal are modulated on the beam emitted by the light source concerned. The signal source/signal processing unit 3 is thereto provided with a transmitter pulse generator 22, a local oscillator 23, a switching element 24 to pass through the local oscillator signal only in the time intervals between the transmitter pulses, and with a laser drive unit 25. From the modulated signal produced by the transmitter and local oscillator signals and applied to drive unit 25 a control signal is obtained to control the current flow through the laser diodes. The phase of this control signal is to be the same for all laser diodes; in principle the path length between laser drive unit 25 and laser diodes 20a–d should therefore be equal. Insofar the laser diodes are part of an integrated circuit, the problem of keeping the path length equal will practically be precluded. A feasible design of a laser diode transmitter is described in Th. L. Maione and D. D. Sell "Experimental Fiber-Optic Transmission System for Interoffice Trunks", IEEE Transactions on Communications, Vol. Com-25, No. 5, May 1977, pp. 517–522. A similar laser diode transmitter circuit is applicable in the separate modules (units 18 and 29 in FIG. 2) to transfer the i.f. signal.

In the embodiment here described the laser diodes are controlled by a control signal modulated by the transmitter and local oscillator signals. It is however also possible to modulate the optical signals conducted by the optical fibers.

The i.f. signal delivered via optical fibers by a certain group of modules is converged into an optical beam and applied to a photodiode circuit. FIG. 1 illustrates four of such photodiode circuits 26a–d; in this figure the optical fibers from modules 2a–n come together at unit 27 where the signals transferred via these optical fibers are converged to form an optical beam. The signals from the photodiode circuits 26a–d are ultimately combined and fed to the detection/video processing device 28. The above-mentioned article in "IEEE Transactions on Communications" describes a feasible embodiment of the photodiode circuits.

To realize certain beam patterns with the phased-array antenna, it may be necessary to preset the amplitudes of the transmitter signals applied to the individual radiating elements to certain values, i.e. to introduce a fixed amplitude taper, as well as to control the phase of these signals. This amplitude taper may be introduced in the various modules by electronic means or by providing these modules with optical attenuators having certain attenuation coefficients. Preference is given to the latter method, because an electronic attenuation in the modules will be at the sacrifice of their uniformity, which is of great significance from a manufacturing point of view.

We claim:

1. Phased array radar provided with an antenna of which the radiating elements are connected to associated r.f. transmitter-receiver modules, each of which modules being fed with a transmitter signal and a local oscillator signal and, upon reception of an echo signal via said antenna, each of which modules delivering an i.f. signal, characterized in that a system of fiber optical waveguides is incorporated to distribute to said modules the transmitter signal and the local oscillator signal, both of which signals being modulated on carriers, which are frequency-matched to said system of fiber optical waveguides, where each of said modules comprises a demodulator to procure the transmitter signal and the local oscillator signal from the applied modulated signals.

2. Phased array radar as claimed in claim 1, characterized in that for each module one fiber optical waveguide is incorporated to conduct both the transmitter signal and the local oscillator signal.

3. Phase array radar as claimed in claim 1, characterized in that each of the modules is provided with a modulator and a light source for generating carriers which are frequency-matched to the system of fiber optical conductors, while said system of fiber optical conductors is designed to combine the i.f. signals delivered by the individual modules, which i.f. signals are modulated on the carriers generated in the modules concerned.

4. Phased array radar as claimed in claim 1, characterized in that for each group of fiber optical conductors a separate laser is incorporated to generate the carriers conveying the transmitter signal and the local oscillator signal to the module concerned.

* * * * *